(12) United States Patent
Kim et al.

(10) Patent No.: US 9,709,816 B2
(45) Date of Patent: Jul. 18, 2017

(54) IMAGE DISPLAY APPARATUS USING TRANSFLECTIVE ELECTRO-OPTIC DEVICE

(71) Applicant: KOREA INSTITUTE OF SCIENCE AND TECHNOLOGY, Seoul (KR)

(72) Inventors: Sung Kyu Kim, Seoul (KR); Seon Kyu Yoon, Gyeonggi-Do (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 7 days.

(21) Appl. No.: 14/803,321

(22) Filed: Jul. 20, 2015

(65) Prior Publication Data

US 2016/0018663 A1 Jan. 21, 2016

(30) Foreign Application Priority Data

Jul. 21, 2014 (KR) ........................ 10-2014-0092106

(51) Int. Cl.
*G02B 27/22* (2006.01)
*G02B 27/10* (2006.01)
*G02B 27/14* (2006.01)

(52) U.S. Cl.
CPC ..... *G02B 27/2271* (2013.01); *G02B 27/1066* (2013.01); *G02B 27/14* (2013.01); *G02B 27/2221* (2013.01)

(58) Field of Classification Search
CPC G02B 27/2221; G02B 27/22; G02B 27/1066; G02B 27/14; G02B 27/2271
USPC ...... 359/479, 458, 462; 345/629; 348/42, 54
See application file for complete search history.

(56) References Cited

U.S. PATENT DOCUMENTS

| 6,449,090 B1* | 9/2002 | Omar ................. | G02B 27/2214 348/51 |
|---|---|---|---|
| 6,703,988 B1* | 3/2004 | Fergason ........... | G02B 27/2235 345/4 |
| 7,874,682 B2 | 1/2011 | Ferren et al. | |
| 8,730,224 B2* | 5/2014 | Lee ........................ | G02B 27/26 345/211 |
| 8,885,018 B2* | 11/2014 | Smith ................. | G02B 27/2214 345/32 |
| 2009/0167846 A1* | 7/2009 | Niioka ............... | G02B 27/2214 348/54 |
| 2010/0265284 A1* | 10/2010 | Satou ..................... | G09G 3/003 345/697 |
| 2010/0302485 A1* | 12/2010 | Kleverman .......... | G02B 6/0011 349/113 |

(Continued)

FOREIGN PATENT DOCUMENTS

| KR | 20020072428 A | 9/2002 |
|---|---|---|
| KR | 20110100605 A | 9/2011 |
| KR | 20120059575 A | 6/2012 |

*Primary Examiner* — William R Alexander
(74) *Attorney, Agent, or Firm* — Ladas & Parry LLP

(57) ABSTRACT

Provided is an image display apparatus using a transflective electro-optic device. When a tiled large-screen image display apparatus using a plurality of flat panel displays is implemented, light emitted in two directions may be combined using the transflective electro-optic device. Accordingly, it is possible to effectively remove a visual obstacle caused by the frames of the plurality of flat panel displays, increase the degree of visual immersion, and also enable minimization of the volume of the image display apparatus and modularization of the same.

8 Claims, 8 Drawing Sheets

(56) References Cited

U.S. PATENT DOCUMENTS

| | | | | |
|---|---|---|---|---|
| 2012/0013610 A1* | 1/2012 | Chae | ............ | G02B 27/22 |
| | | | | 345/419 |
| 2013/0088418 A1* | 4/2013 | Kim | ............ | H04N 13/0434 |
| | | | | 345/92 |
| 2013/0271676 A1* | 10/2013 | Kim | ............ | G02B 27/22 |
| | | | | 349/15 |
| 2014/0375621 A1* | 12/2014 | Lee | ............ | G09G 3/003 |
| | | | | 345/212 |

* cited by examiner

IMAGE DISPLAY APPARATUS USING TRANSFLECTIVE ELECTRO-OPTIC DEVICE

CROSS-REFERENCE TO RELATED APPLICATION

This application claims priority to and the benefit of Korean Patent Application No. 2014-0092106, filed on Jul. 21, 2014, the disclosure of which is incorporated herein by reference in its entirety.

BACKGROUND

1. Field of the Invention

The present invention relates to an image display apparatus using a transflective electro-optic device, and more particularly, to an image display apparatus that combines light emitted in two directions using a transflective electro-optic device to effectively remove a visual obstacle caused by the frames of a plurality of flat panel displays, increase the degree of visual immersion, and also enable minimization of its volume and modularization thereof when a tiled large-screen image display apparatus using the plurality of flat panel displays is implemented as the image display apparatus.

2. Discussion of Related Art

In general, to configure a three-dimensional (3D) display using flat panel displays to have a large screen, the flat panel displays are connected in horizontal and vertical directions in the form of tiles. This results in an area in which it is not possible to provide images because of the cases and the fixing portions of the flat panel displays.

To solve this problem, Korean Patent Publication No. 10-2012-0059575 discloses a technology of a tiled display with overlapping flexible substrates, in which displays using the flexible substrates are used to overlap pixels of the displays and constitute the tiled display.

In addition, Korean Patent Publication No. 10-2011-0100605 discloses an apparatus for hiding a non-display area of a display panel, in which an optical device is used to hide the edge of a single display, remove a seam of a tiled display, and provide a uniform display image.

Further, an existing 3D display using a flat panel display spatially separates viewpoint images, which are distributed to and disposed at pixels of the flat panel display, according to the respective viewpoint images using a parallax barrier or a lenticular lens, so that a viewer in front of the 3D display may see a 3D image. However, the resolution of the display panel is divided according to viewpoints, and thus the resolution of each viewpoint image is reduced.

Moreover, in the process of forming a viewing zone by an existing 3D display, brightness is reduced at the edge of a unit viewing zone, and the non-uniformity of brightness causes inconvenience when viewing images.

SUMMARY OF THE INVENTION

The present invention is directed to providing an image display apparatus that combines light emitted in two directions using a transflective electro-optic device to effectively remove a visual obstacle caused by the frames of a plurality of flat panel displays, increase the degree of visual immersion, and also enable minimization of its volume and modularization thereof when a tiled large-screen image display apparatus using the plurality of flat panel displays is implemented as the image display apparatus.

The present invention is also directed to providing an image display apparatus that enables an increase in the resolution of viewpoint-specific images of a three-dimensional (3D) display using a transflective electro-optic device.

The present invention is also directed to providing an image display apparatus that enables an increase in the number of viewpoints of a 3D display using a transflective electro-optic device.

According to an aspect of the present invention, there is provided an image display apparatus using a transflective electro-optic device, the image display apparatus including: a plurality of flat panel displays alternately disposed horizontally and vertically; and the transflective electro-optic device diagonally disposed between a horizontally disposed flat panel display and a vertically disposed flat panel display at a predetermined angle. Screens of the respective flat panel displays are disposed toward the transflective electro-optic device, and outermost portions of display regions of the respective flat panel displays are disposed to overlap each other.

According to another aspect of the present invention, there is provided an image display apparatus using a transflective electro-optic device, the image display apparatus including: a first flat panel display disposed horizontally; second and third flat panel displays vertically disposed a predetermined distance away from the first flat panel display in horizontal and vertical directions on both sides of the first flat panel display, and disposed at a predetermined angle with respect to both side edges of the first flat panel display to face each other; and the transflective electro-optic device diagonally disposed at a predetermined angle upward from a bottom plane of the second and third flat panel displays. Screens of the first to third flat panel displays are disposed toward the transflective electro-optic device, and outermost portions of display regions of the first to third flat panel displays are disposed to overlap each other.

Here, when a shortest horizontal distance between the transflective electro-optic device and the second and third flat panel displays is a first reference line and a shortest vertical distance between the transflective electro-optic device and the first flat panel display is a second reference line, the first reference line and the second reference line may have identical lengths and may be perpendicular to each other.

The transflective electro-optic device may be at least one of a transflective mirror, a transflective film, and a transparent plate combined with a transflective film.

According to another aspect of the present invention, there is provided an image display apparatus using a transflective electro-optic device, the image display apparatus including: a first transflective electro-optic device diagonally disposed at a predetermined angle upward from a reference horizontal plane and a predetermined distance away from a viewer; a first display unit disposed on a side of the reference horizontal plane opposite to the viewer based on the first transflective electro-optic device; and a second display unit disposed above or below the first transflective electro-optic device based on the first transflective electro-optic device. The first display unit includes a plurality of flat panel displays alternately disposed horizontally and vertically for a plurality of odd-numbered rows or columns, and a second transflective electro-optic device diagonally disposed at a predetermined angle between the flat panel display disposed horizontally and the flat panel display disposed vertically. The second display unit includes a plurality of flat panel displays alternately disposed horizontally and vertically for a plurality of even-numbered rows or columns, and a third transflective electro-optic device diagonally disposed at a predetermined angle between the flat panel display disposed horizontally and the flat panel display disposed vertically. Screens of the respective flat panel displays of the first and second display units are disposed toward the second and third transflective electro-optic devices, respectively, and outermost portions of display regions of the respective flat panel displays are disposed to overlap each other. Screens of the first and second display units are disposed toward the first transflective electro-optic device, and outermost portions of display regions of the respective first and second display units are disposed to overlap each other.

According to another aspect of the present invention, there is provided an image display apparatus using a transflective electro-optic device, the image display apparatus including: a first transflective electro-optic device diagonally disposed at a predetermined angle upward from a reference horizontal plane and a predetermined distance away from a viewer; a first display unit disposed on a side of the reference horizontal plane opposite to the viewer based on the first transflective electro-optic device; and a second display unit disposed above or below the first transflective electro-optic device based on the first transflective electro-optic device. The first display unit includes a plurality of flat panel displays alternately disposed horizontally and vertically for a plurality of even-numbered rows or columns, and a second transflective electro-optic device diagonally disposed at a predetermined angle between the flat panel display disposed horizontally and the flat panel display disposed vertically. The second display unit includes a plurality of flat panel displays alternately disposed horizontally and vertically for a plurality of odd-numbered rows or columns, and a third transflective electro-optic device diagonally disposed at a predetermined angle between the flat panel display disposed horizontally and the flat panel display disposed vertically. Screens of the respective flat panel displays of the first and second display units are disposed toward the second and third transflective electro-optic devices, respectively, and outermost portions of display regions of the respective flat panel displays are disposed to overlap each other. Screens of the first and second display units are disposed toward the first transflective electro-optic device, and outermost portions of display regions of the respective first and second display units are disposed to overlap each other.

According to another aspect of the present invention, there is provided an image display apparatus using a transflective electro-optic device, the image display apparatus including: a first transflective electro-optic device diagonally disposed at a predetermined angle upward from a reference horizontal plane and a predetermined distance away from a viewer; a plurality of odd-numbered row display units vertically disposed at predetermined distance above a side of the reference horizontal plane opposite to the viewer based on the first transflective electro-optic device; and a plurality of even-numbered row display units horizontally disposed at predetermined distance above or below the first transflective electro-optic device based on the first transflective electro-optic device. Each of the odd-numbered row display units includes a plurality of flat panel displays alternately disposed horizontally and vertically for respective odd-numbered rows, and a second transflective electro-optic device diagonally disposed at a predetermined angle between the flat panel display disposed horizontally and the flat panel display disposed vertically. Each of the even-numbered row display units includes a plurality of flat panel displays alternately disposed horizontally and vertically for respective even-numbered rows, and a third transflective electro-optic device diagonally disposed at a predetermined angle between the flat panel display disposed horizontally and the flat panel display disposed vertically. Screens of the respective flat panel displays of the plurality of odd-numbered row display units and the plurality of even-numbered row display units are disposed toward the second and third transflective electro-optic devices, respectively, and outermost portions of display regions of the respective flat panel displays are disposed to overlap each other. Screens of the plurality of the odd-numbered row display units and the plurality of the even-numbered row display units are disposed toward the first transflective electro-optic device, and outermost portions of display regions of the respective odd-numbered row and even-numbered row display units are disposed to overlap each other.

According to another aspect of the present invention, there is provided an image display apparatus using a transflective electro-optic device, the image display apparatus including: a first transflective electro-optic device diagonally disposed at a predetermined angle upward from a reference horizontal plane and a predetermined distance away from a viewer; a plurality of even-numbered row display units vertically disposed at predetermined distance above a side of the reference horizontal plane opposite to the viewer based on the first transflective electro-optic device; and a plurality of odd-numbered display units horizontally disposed at predetermined distance above or below the first transflective electro-optic device based on the first transflective electro-optic device. Each of the even-numbered row display units includes a plurality of flat panel displays alternately disposed horizontally and vertically for respective even-numbered rows, and a second transflective electro-optic device diagonally disposed at a predetermined angle between the flat panel display disposed horizontally and the flat panel display disposed vertically. Each of the odd-numbered row display units includes a plurality of flat panel displays alternately disposed horizontally and vertically for respective odd-numbered rows, and a third transflective electro-optic device diagonally disposed at a predetermined angle between the flat panel display disposed horizontally and the flat panel display disposed vertically. Screens of the respective flat panel displays of the plurality of even-numbered row display units and the plurality of odd-numbered row display units are disposed toward the second and third transflective electro-optic devices, respectively, and outermost portions of display regions of the respective flat panel displays are disposed to overlap each other. Screens of the plurality of the even-numbered row display units and the plurality of the odd-numbered row display units are disposed toward the first transflective electro-optic device, and outermost portions of display regions of the respective odd-numbered row and even-numbered row display units are disposed to overlap each other.

Here, each of the first to third transflective electro-optic devices may be at least one of a transflective mirror, a transflective film, and a transparent plate combined with a transflective film.

According to another aspect of the present invention, there is provided an image display apparatus using a transflective electro-optic device, the image display apparatus including: a first display disposed horizontally; a second display disposed perpendicular to the first display; and a transflective electro-optic device diagonally disposed at a predetermined angle between the first and second displays.

Screens of the first and second displays are disposed toward the transflective electro-optic device.

Here, the first and second displays may be 3D displays, and a viewpoint image displayed by the second display may be positioned between viewpoint intervals of viewpoint images displayed by the first display.

The first and second displays may be 3D displays, and a viewpoint zone of the second display may be positioned between viewpoints of the first display.

The first and second displays may be 3D displays, and a viewing zone center of the second display may be disposed to cross each other between viewpoints of the first display.

The transflective electro-optic device may be at least one of a transflective mirror, a transflective film, and a transparent plate combined with a transflective film.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
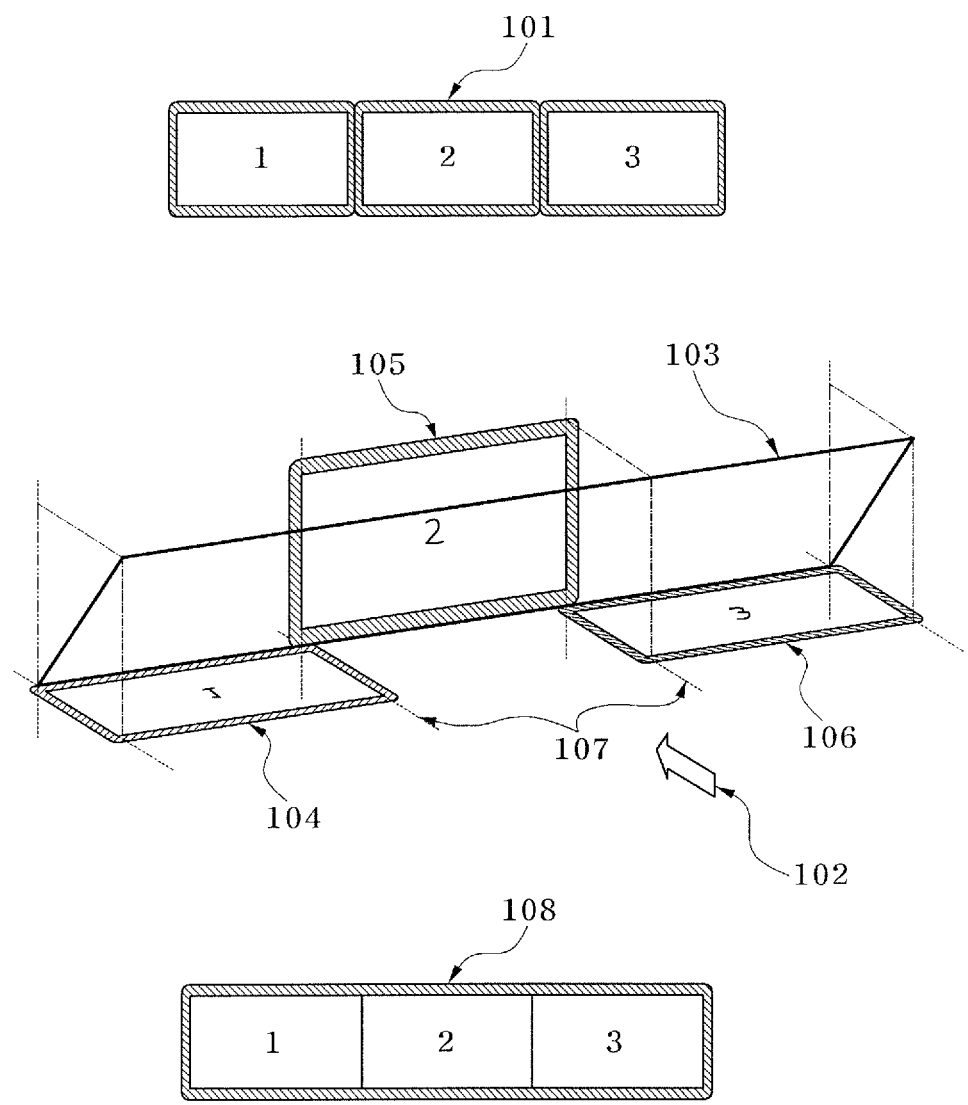
FIG. 1 is a conceptual diagram of an image display apparatus using a transflective electro-optic device according to a first exemplary embodiment of the present invention.

FIG. 1 is a conceptual diagram of an image display apparatus using a transflective electro-optic device according to a first exemplary embodiment of the present invention.

Referring to FIG. 1, a general tiled display 101 has portions of frames at which no image is shown between flat panel displays 1 to 3. These are visual obstacles.

To remove these visual obstacles, a transflective electro-optic device 103 may be used in the first exemplary embodiment of the present invention. Here, the transflective electro-optic device 103 reflects 50% of incident light and transmits the other 50%. Such a transflective electro-optic device 103 may be implemented in various forms, for example, a transflective mirror, a transflective film, and a transparent plate combined with a transflective film (e.g., an acryl, polymethylmethacrylate (PMMA), and glass). The same transflective electro-optic device 103 is applied to exemplary embodiments to be described below.

The transflective electro-optic device 103 is inclined at a predetermined angle (preferably, about 45 degrees) with respect to a view direction 102, and a plurality of flat panel displays 104 to 106 are alternately disposed in a vertical plane and a horizontal plane.

In this case, outermost portions of the display regions of the respective flat panel displays 104 to 106 may be disposed to overlap each other as indicated by a reference number 107. Since the display regions of adjacent displays overlap each other in this way, it is possible to implement a large-screen image display apparatus 108 from which visual obstacles are removed according to the first exemplary embodiment of the present invention. This may be applied to a three-dimensional (3D) display in the same way.

Figure 2:
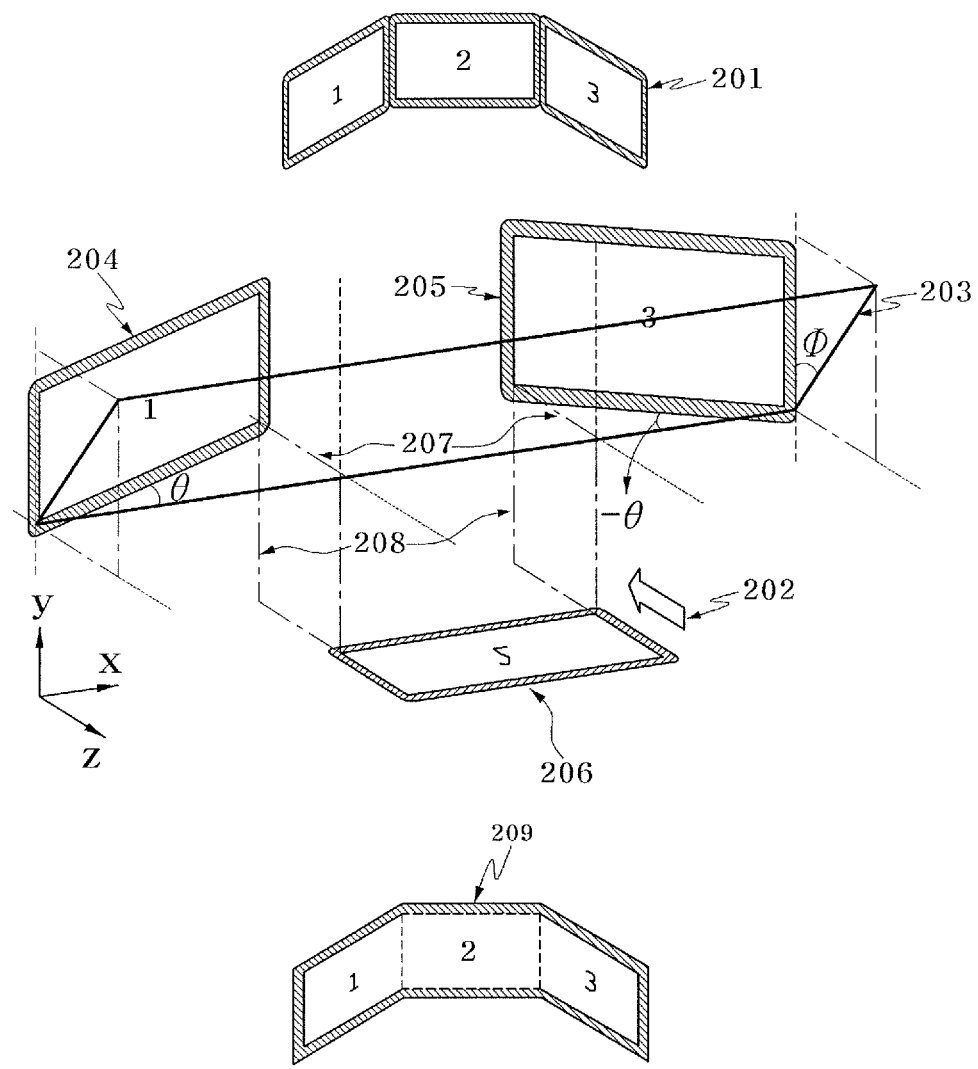
FIG. 2 is a conceptual diagram of an image display apparatus using a transflective electro-optic device according to a second exemplary embodiment of the present invention.

FIG. 2 is a conceptual diagram of an image display apparatus using a transflective electro-optic device according to a second exemplary embodiment of the present invention.

Referring to FIG. 2, the second exemplary embodiment of the present invention is a large-screen image display apparatus employing a bent tiled display for visual convenience. In general, a large-screen image display apparatus 201 employing an existing bent tiled display 1 to 3 has visual obstacles caused by frames.

To remove such a visual obstacle, a transflective electro-optic device 203 may be used in the second exemplary embodiment of the present invention. When a view direction 202 is the negative z-axis direction, the transflective electro-optic device 203 is disposed in the horizontal direction (x-axis direction) and a surface of the transflective electro-optic is diagonally disposed at a predetermined angle Φ (preferably, about 45 degrees) with respect to the vertical direction (y-axis direction), and flat panel displays 204 and 205 disposed on the left and right sides in the horizontal direction (x-axis direction) are rotated by predetermined angles ±θ from the horizontal direction (x-axis direction), so that respective display surfaces enlarged through the transflective electro-optic device 203 are disposed at the same distance or similar distances from a viewer position, that is, in the view direction 202.

Here, both sides of the middle flat panel display 206 may be disposed to overlap the operation regions of the flat panel displays 204 and 205. In this case, reference lines are indicated by reference numbers 207 and 208. The length of the reference line 207 is the depth-direction (z-axis direction) distance between the transflective electro-optic device 203 and the lower-right corner of the operation region of the left flat panel display 204, also the depth-direction (z-axis direction) distance between the transflective electro-optic device 203 and the lower-left corner of the operation region of the right flat panel display 205, also the vertical-direction (y-axis direction) distance between the transflective electro-optic device 203 and the right corners of the operation region of the middle flat panel display 206.

The reference lines 207 defined above and 208 have the same length and are perpendicular to each other. When the reference lines 207 and 208 overlaps two edges of operation regions of the respective flat panel displays 204 to 206, a viewer may view an image of a large-screen image display apparatus 209 according to the second exemplary embodiment of the present invention from which a visual obstacle is removed as shown in the bottom of FIG. 2. This may be applied to a 3D display in the same way.

Figure 3:
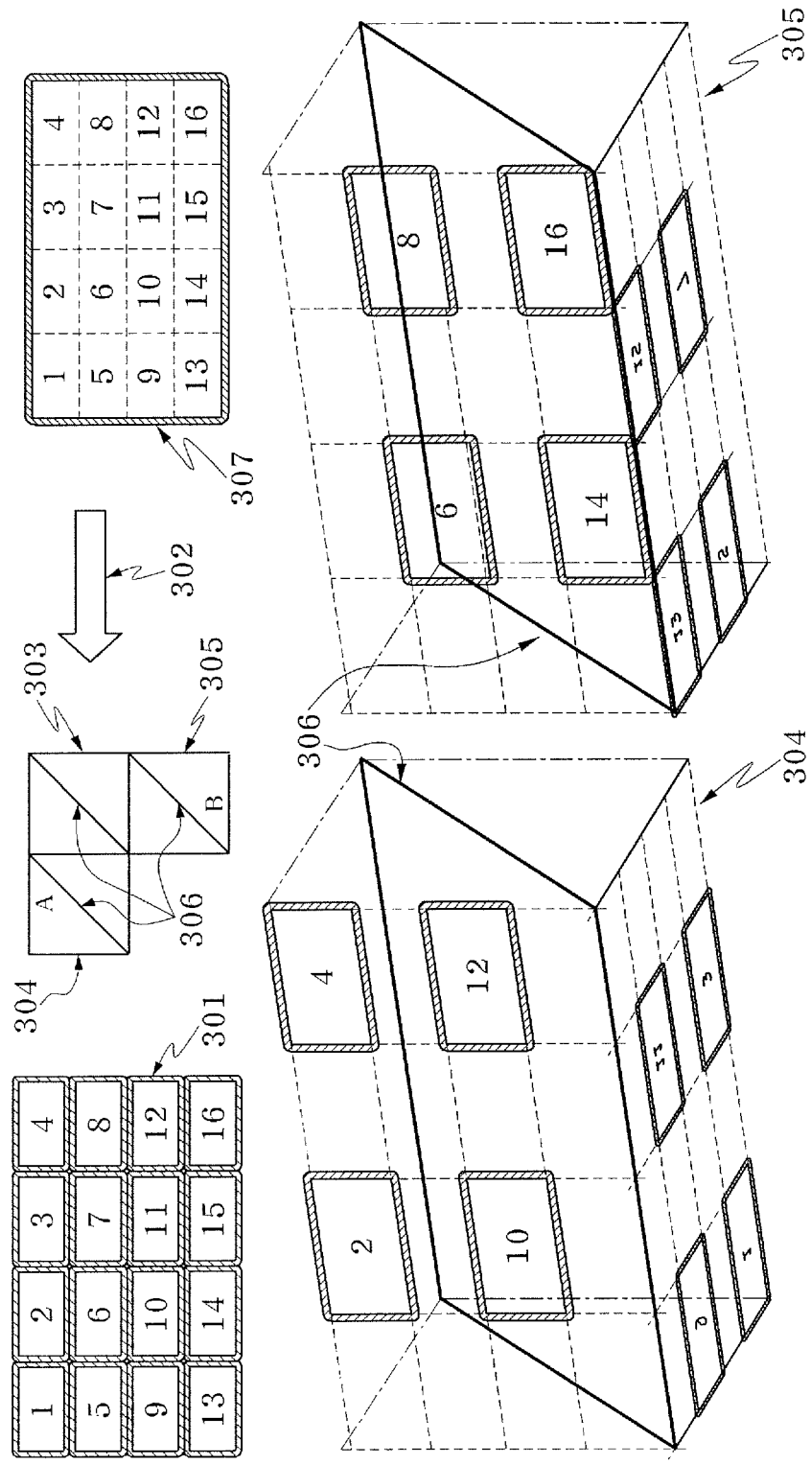
FIG. 3 is a conceptual diagram of an image display apparatus using transflective electro-optic devices according to a third exemplary embodiment of the present invention.

FIG. 3 is a conceptual diagram of an image display apparatus using transflective electro-optic devices according to a third exemplary embodiment of the present invention.

Referring to FIG. 3, in a general tiled image display apparatus 301 expanded in the form of a matrix using a horizontal and vertical array, a plurality of flat panel displays 1 to 16 are disposed in the form of a matrix. Here, a visual obstacle occurs in the form of a net.

To remove such a visual obstacle in the form of a net, three transflective electro-optic devices 306 may be used in the third exemplary embodiment of the present invention. In other words, a first display unit 303 combines images displayed on second and third display units 304 and 305 in a view direction 302, and has a transflective electro-optic device 306.

In the second display unit 304, flat panel displays 1, 2, 3, 4, 9, 10, 11, and 12 of odd-numbered rows are alternately disposed on a vertical plane and a horizontal plane like in the first exemplary embodiment of the present invention, and in the third display unit 305, flat panel displays 5, 6, 7, 8, 13, 14, 15, and 16 of even-numbered rows are alternately disposed on a vertical plane and a horizontal plane like in the first exemplary embodiment.

Here, a lattice is the image display area of a flat panel display unit. Images displayed by the second and third display units 304 and 305 pass through the first display unit 303, so that a viewer may view an image of a large-screen image display apparatus 307 according to the third exemplary embodiment of the present invention from which a visual obstacle is removed as shown in the upper right of FIG. 3.

Meanwhile, the second and third display units 304 and 305 are arranged in a row, but may be arranged in a column. The third display unit 305 is disposed under the first display unit 303, but may be disposed on the first display unit 303. Also, the second display unit 304 and the third display unit 305 may be implemented for even-numbered rows and odd-numbered rows, respectively. This may be applied to a 3D display in the same way.

With reference to FIG. 3, the configuration of the image display apparatus 307 according to the third exemplary embodiment of the present invention is described in detail as follows. The transflective electro-optic devices 306 are diagonally disposed at predetermined angles (preferably, about 45 degrees) upward from a reference horizontal plane and predetermined distances away from a viewer.

The second display unit 304 is disposed on a side of the reference horizontal plane opposite to the viewer based on one transflective electro-optic device 306.

Here, the second display unit 304 includes the plurality of flat panel displays 1, 2, 3, 4, 9, 10, 11, and 12 of odd-numbered rows alternately disposed horizontally and vertically, and another transflective electro-optic device 306 diagonally disposed at a predetermined angle (preferably, about 45 degrees) between the flat panel displays 1, 3, 9, and 11 disposed horizontally and the flat panel displays 2, 4, 10, and 12 disposed vertically.

The third display unit 305 is disposed above or below the one transflective electro-optic device 306.

Here, the third display unit 305 includes the plurality of flat panel displays 5, 6, 7, 8, 13, 14, 15, and 16 of even-numbered rows alternately disposed horizontally and vertically, and a remaining transflective electro-optic device 306 diagonally disposed at a predetermined angle (preferably, about 45 degrees) between the flat panel displays 5, 7, 13, and 15 disposed horizontally and the flat panel displays 6, 8, 14, and 16 disposed vertically.

Meanwhile, the screens of the respective flat panel displays 1 to 16 of the second and third display units 304 and 305 may be disposed toward the transflective electro-optic devices 306, and also outermost portions of the display regions of the respective flat panel displays 1 to 16 may be disposed to overlap each other.

In addition, the screens of the second and third display units 304 and 305 may be disposed toward the transflective electro-optic devices 306, and outermost portions of the display regions of the respective second and third display units 304 and 305 may be disposed to overlap each other.

Figure 4:
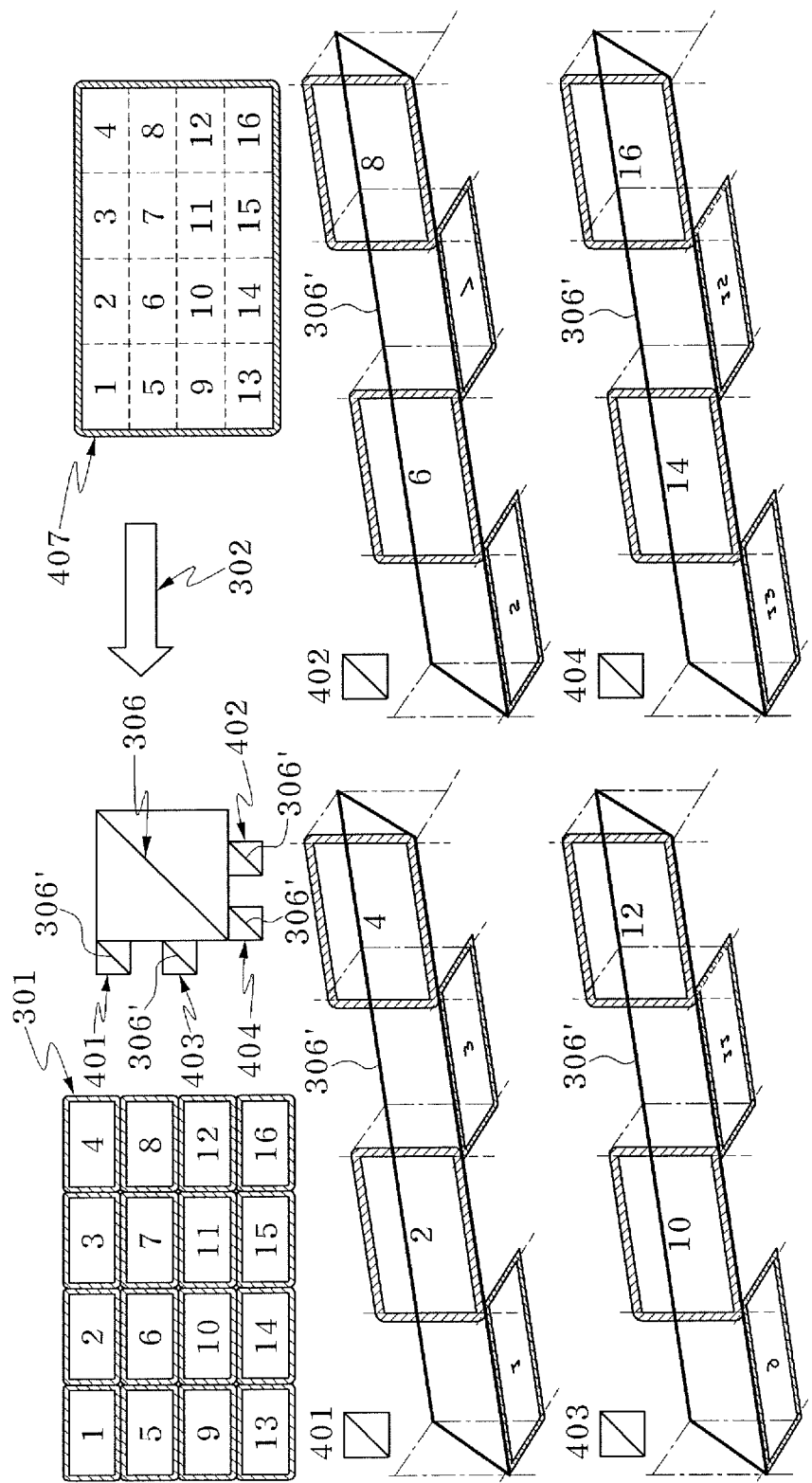
FIG. 4 is a conceptual diagram of an image display apparatus using transflective electro-optic devices according to a fourth exemplary embodiment of the present invention.

FIG. 4 is a conceptual diagram of an image display apparatus using transflective electro-optic devices according to a fourth exemplary embodiment of the present invention.

Referring to FIG. 4, in a general tiled image display apparatus 301 expanded in the form of a matrix using a horizontal and vertical array, a plurality of flat panel displays 1 to 16 are disposed in the form of a matrix. Here, a visual obstacle occurs in the form of a net.

To remove such a visual obstacle in the form of a net, one large transflective electro-optic device 306 and first to fourth tiled image display apparatuses 401 to 404 having four small transflective electro-optic devices 306' and arranged horizontally may be used in the fourth exemplary embodiment of the present invention.

In other words, the transflective electro-optic device 306 combines images displayed by the first to fourth display units 401 and 404 in a view direction 302. The first to fourth tiled image display apparatuses 401 to 404 respectively have sets of four flat panel displays 1 to 4, 5 to 8, 9 to 12, and 13 to 16 arranged horizontally like the above-described horizontal arrangement of three flat panel displays shown in FIG. 1.

As shown in the upper right of FIG. 4, a viewer may view an image of a large-screen image display apparatus 407 according to the fourth exemplary embodiment of the present invention from which a visual obstacle is removed. The image may be the same as the result of FIG. 3 described above, and it is possible to minimize a space occupied by the equipment.

With reference to FIG. 4, the configuration of the image display apparatus 407 according to the fourth exemplary embodiment of the present invention is described in detail as follows. The first transflective electro-optic device 306 is diagonally disposed at a predetermined angle (preferably, about 45 degrees) upward from a reference horizontal plane and a predetermined distance away from a viewer.

A plurality of odd-numbered row display units 401 and 403 are disposed at predetermined vertical distance above a side of the reference horizontal plane opposite to the viewer based on the first transflective electro-optic device 306.

Here, each of the odd-numbered row display units 401 and 403 includes the plurality of flat panel displays 1 to 4 or 9 to 12 of odd-numbered rows alternately disposed horizontally and vertically, and a second transflective electro-optic device 306' diagonally disposed at a predetermined angle (preferably, about 45 degrees) between the flat panel displays 1 and 3 or 9 and 11 disposed horizontally and the flat panel displays 2 and 4 or 11 and 12 disposed vertically.

Also, a plurality of even-numbered row display units 402 and 404 are disposed at predetermined horizontal distance above or below the first transflective electro-optic device 306.

Each of the even-numbered row display units 402 and 404 includes the plurality of flat panel displays 5 to 8 or 13 to 16 of even-numbered rows alternately disposed horizontally and vertically, and a third transflective electro-optic device 306' diagonally disposed at a predetermined angle (preferably, about 45 degrees) between the flat panel displays 5 and 7 or 13 and 15 disposed horizontally and the flat panel displays 6 and 8 or 14 and 16 disposed vertically.

Meanwhile, the screens of the respective flat panel displays 1 to 16 of the plurality of odd-numbered row display units 401 and 403 and the plurality of even-numbered row display units 402 and 404 may be disposed toward the second and third transflective electro-optic devices 306', respectively, and also outermost portions of the display regions of the respective flat panel displays 1 to 16 may be disposed to overlap each other.

FIGS. 5A, 5B, 5C and 5D are conceptual diagrams of an image display apparatus using a transflective electro-optic device according to a fifth exemplary embodiment of the present invention.

Referring to FIGS. 5A, 5B, 5C and 5D, in existing 3D displays 501 and 503, viewpoint images are separated, and resolutions are reduced. In the fifth exemplary embodiment of the present invention, a transflective electro-optic device 506 may be used to effectively compensate for the degradation of resolution.

When 3D displays 501 and 503 are viewed in a view direction 502, the transflective electro-optic device 506 serves to combine images displayed on the two 3D displays 501 and 503.

Specifically, as shown in FIGS. 5A, 5B, 5C and 5D, the 3D display 501 of a first screen and the 3D display 503 of a second screen are 3D displays designed for four viewpoints, and a vertical parallax barrier is installed in front of each of the 3D displays 501 and 503 to spatially separate viewpoint images.

When the two 3D displays 501 and 503 are designed to have an optimal viewing distance of $z_0$, for example, if an eye of a viewer is apart from the 3D display 501 by $z_0$ and positioned at a half height $y_0$ of the 3D display 501 and $x_1$ in the x-axis direction, the eye sees a viewpoint image 1. Also, if the eye is at $x_2$, the eye sees a viewpoint image 2.

Likewise, when the left and right eyes of a viewer are apart from the 3D display 501 by $z_0$ and positioned at $x_3$ and $x_4$ in the x-axis direction, the left and right eyes see a viewpoint image 3 and a viewpoint image 4, respectively. When viewpoint intervals are 32.5 mm in this 4-viewpoint design, if the left and right eyes of a viewer are at $x_3$ and $x_1$ respectively, viewpoint-specific parallax images are viewed by the left and right eyes of the viewer, so that the viewer may view a 3D image.

Using the two 3D displays 501 and 503 designed for four viewpoints as described above and the transflective electro-optic device 506, the resolution of each viewpoint image is increased as follows. The 3D display 501 of the first screen is disposed in the vertical direction (y-axis direction) behind, in the depth direction (z-axis direction), the transflective electro-optic device 506 diagonally disposed with respect to the horizontal direction (x-axis direction), and the 3D display 503 of the second screen is disposed in the horizontal direction (x-axis direction) under the transflective electro-optic device 506 diagonally disposed with respect to the vertical direction (y-axis direction).

Figure 5A:
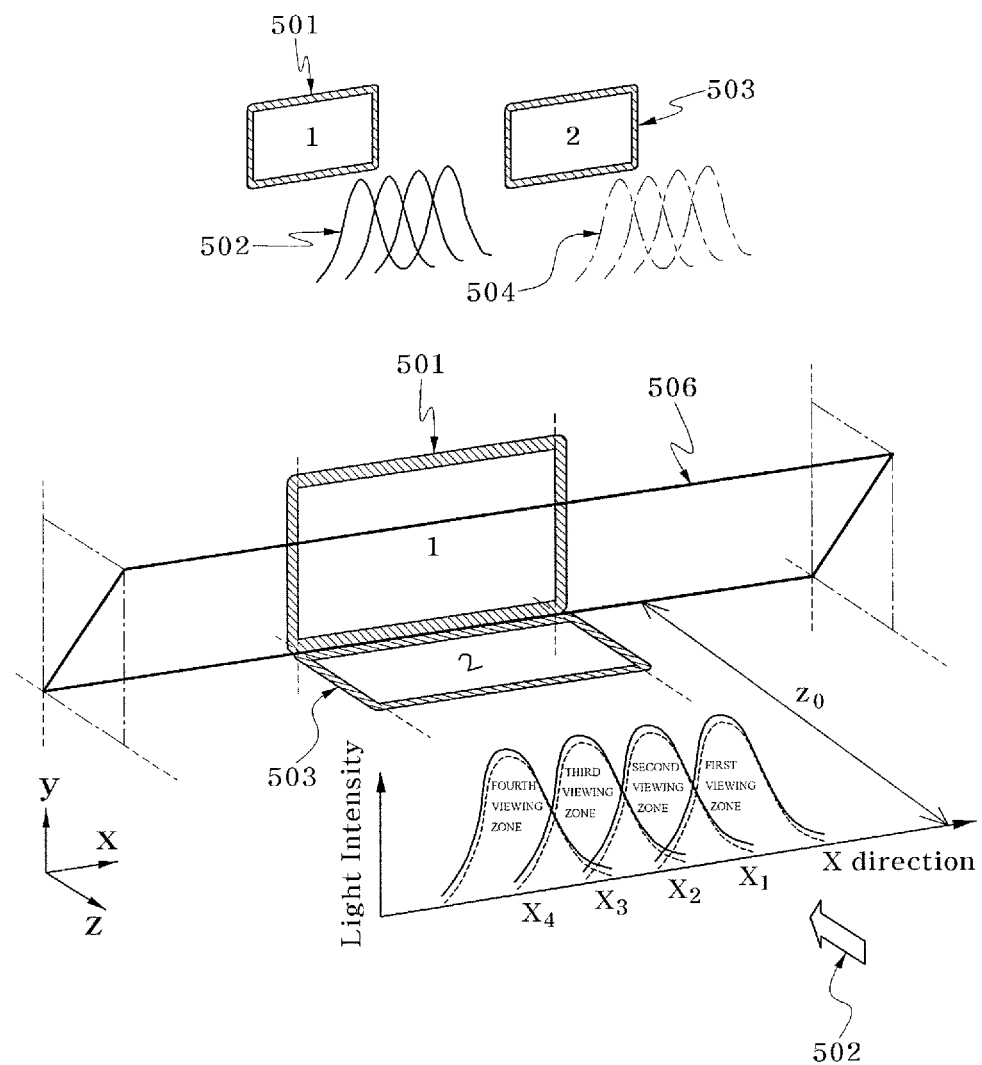
FIGS. 5A, 5B, 5C and 5D are conceptual diagrams of an image display apparatus using a transflective electro-optic device according to a fifth exemplary embodiment of the present invention.

At the optimal viewing distance $z_0$ from the 3D displays 501 and 503 of the first and second screens disposed as described above, viewpoint-specific viewing zones are sequentially formed in the horizontal direction (x-axis direction) (see FIG. 5A).

In this case, the positions of the respective viewpoint-specific viewing zones formed in the horizontal direction (x-axis direction) through the transflective electro-optic device 506 by the 3D display 501 of the first screen and the positions of the respective viewpoint-specific viewing zones formed in the horizontal direction (x-axis direction) by a transmission from the 3D display 503 of the second screen and a reflection by the transflective electro-optic device 506, are made identical or similar, and the 3D display 501 of the first screen and the 3D display 503 of the second screen viewed at a viewer position are formed on the same x-y plane.

In addition, it is necessary to arrange the panels and the parallax separation means (e.g., parallax barriers or lenticular lenses) of the respective 3D displays 501 and 503 so that pixels at which viewpoint images of the same viewing zone are disposed on the 3D display 501 of the first screen and the 3D display 503 of the second screen become different pixels, and the viewpoint images are necessary to be disposed at the pixels.

Figure 5B:
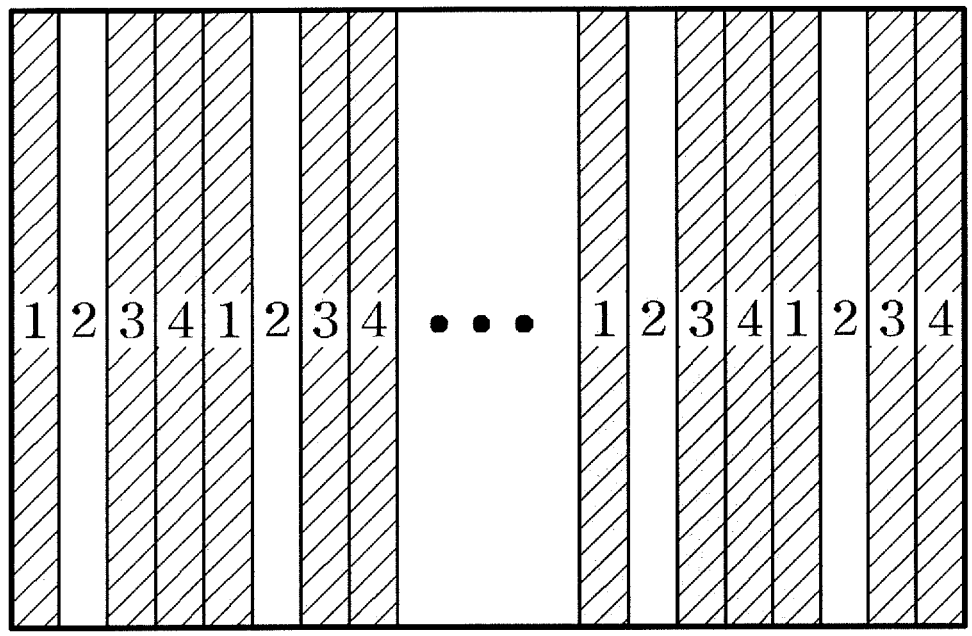
Figure 5C:
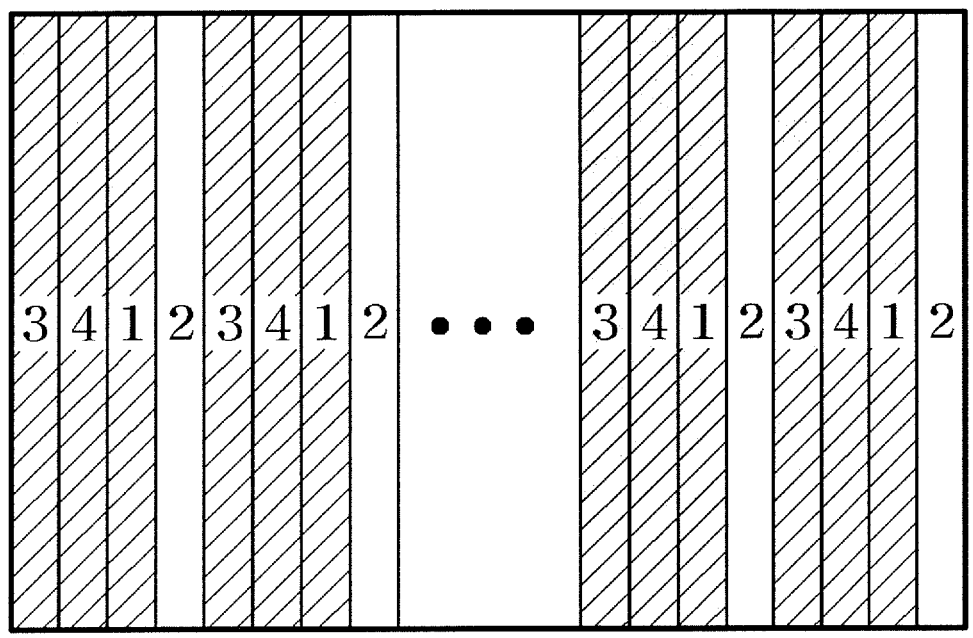
Figure 5D:
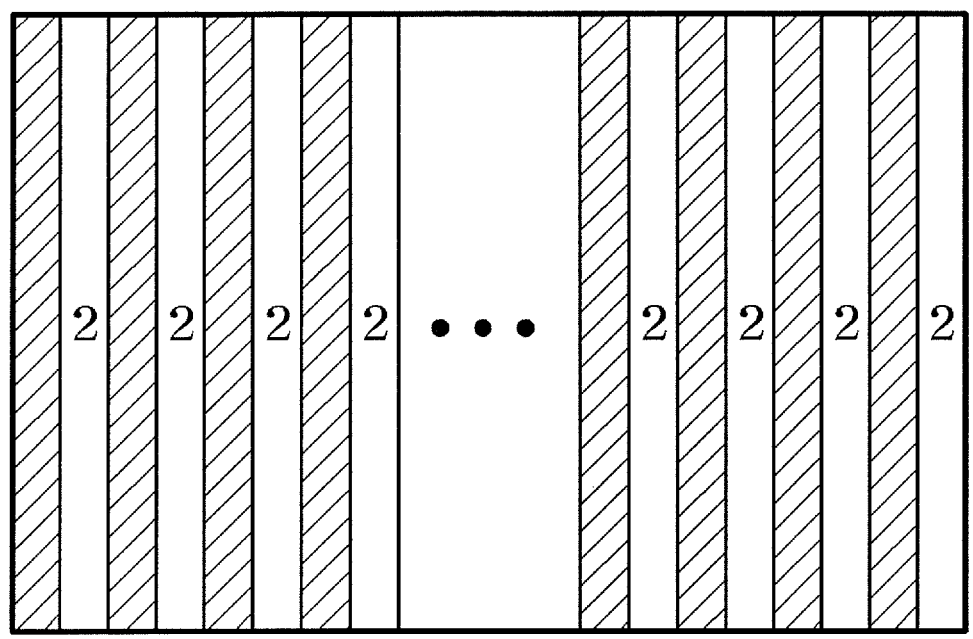

FIGS. 5B, 5C and 5D show pixel positions on a screen at which a viewpoint image seen by any one of the eyes of a viewer is disposed when each of the 3D displays 501 and 503 of the first and second screens is designed for four viewpoints and employs a vertical parallax barrier, and the eye of the viewer is at a 3D spatial position $(x, y, z)=(x_2, y_0, z_0)$.

FIG. 5B is a conceptual diagram illustrating a viewpoint image disposition and a parallax barrier disposition on the 3D display 501 of the first screen when the 3D display 501 is seen at the position $(x, y, z)=(x_2, y_0, z_0)$. FIG. 5C is a conceptual diagram illustrating a viewpoint image disposition and a parallax barrier disposition on the 3D display 503 of the second screen when the 3D display 501 is seen at the position $(x, y, z)=(x_2, y_0, z_0)$. FIG. 5D is a conceptual diagram illustrating the viewpoint image disposition of a viewpoint image 2 on a combination of the 3D display 501 and the 3D display 503 when a screen in which the 3D display 501 of the first screen and the 3D display 503 of the second screen are combined is seen at the position $(x, y, z)=(x_2, y_0, z_0)$.

When an eye of the viewer is at the optimal viewing distance $z_0$ in the depth direction (z-axis direction) and the center position $x_2$ of a second viewing zone, only pixels at which a second viewpoint image is disposed are shown on the 3D display 501 of the first screen (see FIG. 5B).

Since vertical parallax barriers are used in the example of the present invention, vertical-direction (y-axis direction) pixels are disposed as the same viewpoint image. In this case, a 3D horizontal resolution becomes a quarter of the horizontal resolution of a display. Even when an eye of a viewer at the same 3D spatial position $(x, y, z)=(x_2, y_0, z_0)$ views the 3D display 503 of the second screen, a 3D horizontal resolution becomes a quarter of the horizontal resolution of the 3D display 503 like in the case of the 3D display 501 of the first screen.

However, the viewpoint image of the 3D display 503 of the second screen is moved by two pixels in the horizontal direction from the viewpoint image disposition of the 3D display 501 of the first screen and disposed. According to the position of the moved viewpoint image, slit portions of the parallax barrier are also moved in the horizontal direction (x-axis direction) and aligned (see FIG. 5C).

After 3D images of the 3D display 501 of the first screen disposed in the vertical direction (y-axis direction) and the 3D display 503 of the second screen, which has changed pixel positions at which the viewpoint image is formed as described above, disposed in the horizontal direction (x-axis direction) are combined through the transflective electro-optic device 506, the horizontal resolution of a screen providing a 2-viewpoint image viewed by eyes of a viewer at the same 3D spatial position $(x, y, z)=(x_2, y_0, z_0)$ becomes half the horizontal resolution of one 3D display (see FIG. 5D).

Therefore, it is possible to provide the resolution of a 3D display providing two viewpoints compared to the reduced resolution of an existing 3D display providing four viewpoints, and thus the resolution of a 3D display providing the same number of viewpoints is increased.

By regarding such an image display apparatus as one 3D display, the concept of this exemplary embodiment may be extended to the tiled displays described in the first to fourth exemplary embodiments. Also, a 3D display using a vertical parallax barrier has been described as an example in the fifth exemplary embodiment of the present invention, but the concept may be extended to a 3D display using a diagonal parallax barrier or a lenticular lens.

In addition, an autostereoscopic 3D display using a parallax barrier or a lenticular lens provides not only a 3D image having a reduced resolution but also a 2D image having a reduced resolution. Therefore, this exemplary embodiment of the present invention is also advantageous for implementing a display for both 2D and 3D uses.

Figure 6:
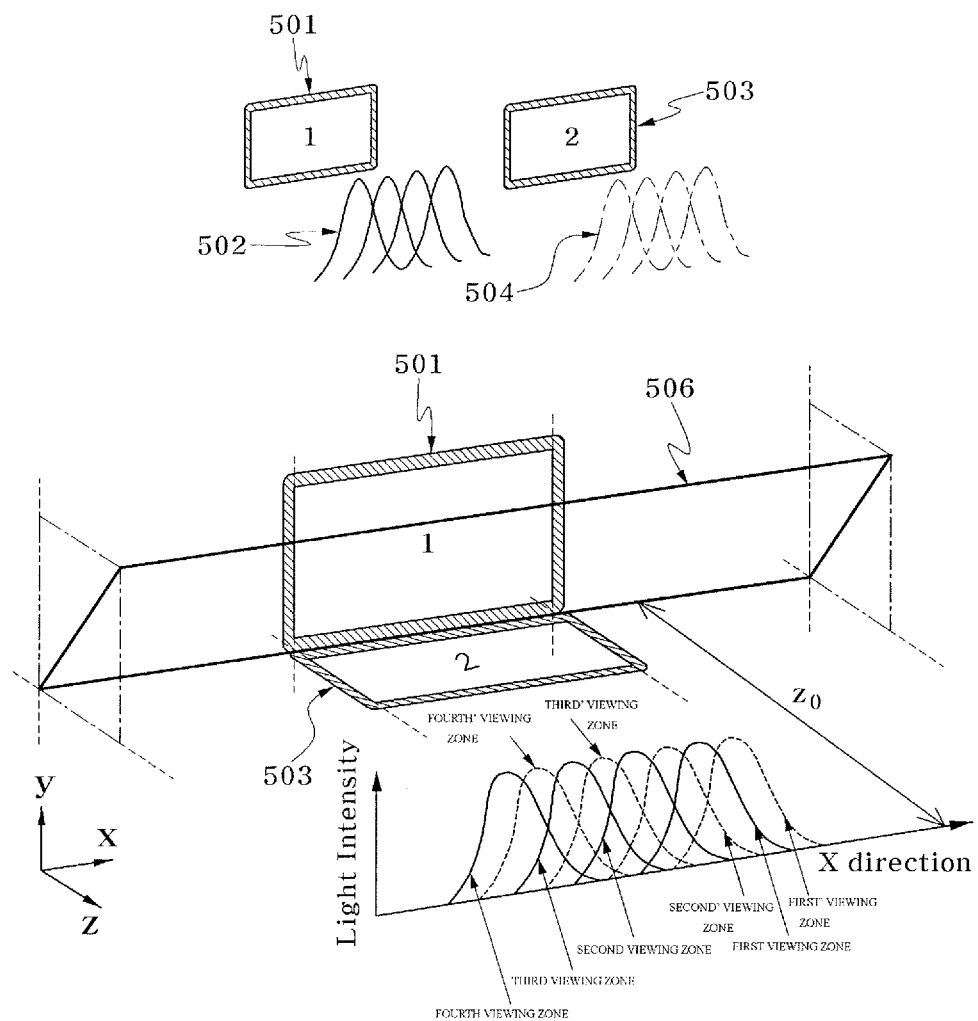
FIG. 6 is a conceptual diagram of an image display apparatus using a transflective electro-optic device according to a sixth exemplary embodiment of the present invention.

FIG. 6 is a conceptual diagram of an image display apparatus using a transflective electro-optic device according to a sixth exemplary embodiment of the present invention, illustrating a method of implementing a 3D display that has the same resolution as respective 3D displays 501 and 503 and an increased number of viewpoints.

Referring to FIG. 6, the 3D display 501 of a first screen and the 3D display 503 of a second screen manufactured using parallax barriers or lenticular lenses decrease in resolution according to the number of viewpoints.

In the sixth exemplary embodiment of the present invention, it is possible to implement a 3D display that has the same resolution as respective 3D displays 501 and 503 and has a double number of viewpoints using a transflective electro-optic device 506, unlike in the fifth exemplary embodiment described above.

The respective 3D displays 501 and 503 are 4-viewpoint 3D displays, and reference numbers 502 and 504 indicate viewing zones formed in the horizontal direction (x-axis direction) at a position a predetermined distance (generally an optimal viewing distance) away from the 3D displays 501 and 503 in the depth direction (z-axis direction), respectively.

The transflective electro-optic device 506 is disposed in the horizontal direction (x-axis direction) and inclined at a predetermined angle (preferably, about 45 degrees) with respect to the vertical direction (y-axis direction). The 3D display 501 of the first screen is disposed behind the transflective electro-optic device 506 in the depth direction (z-axis direction), and the display surface thereof is arranged in the vertical direction (y-axis direction), so that the 3D display 501 of the first screen has an optimal viewing distance $z_0$ in the depth direction (z-axis direction).

When an eye of a viewer is at a half height $y_0$ of the 3D display 501 of the first screen in the vertical direction (y-axis direction), the distribution of four viewing zones (indicated by solid lines in FIG. 6) formed in the horizontal direction (x-axis direction) is obtained.

The 3D display 503 of the second screen is disposed under the transflective electro-optic device 506 in the vertical direction (y-axis direction), and the display surface thereof is arranged in the horizontal direction (x-axis direction), so that the 3D display 503 of the second screen has an optimal viewing distance $z_0$ in the depth direction (z-axis direction).

When an eye of a viewer is at the half height $y_0$ of the 3D display 501 of the first screen in the vertical direction (y-axis direction), the distribution of four viewing zones (indicated by dotted lines in FIG. 6) formed in the horizontal direction (x-axis direction) is obtained.

A viewing zone formed at a position $z=z_0$ in the depth direction (z-axis direction) by the 3D display 503 of the second screen is apart from a viewing zone formed by the 3D display 501 of the first screen by half a viewpoint interval.

In addition, by disposing viewpoint images of the 3D display 503 of the second screen at positions moved in the horizontal direction (x-axis direction) from viewpoint images of the 3D display 501 of the first screen by half a viewpoint interval, it is possible to implement a 3D display having a double number of viewpoints compared to each of the 3D displays 501 and 503 of the first and second screens. The concept of this exemplary embodiment may be extended to the tiled displays described in the first to fourth exemplary embodiment.

When a tiled large-screen image display apparatus using a plurality of flat panel displays is implemented as an image display apparatus using a transflective electro-optic device according to an embodiment of the present invention as described above, light emitted from two directions is combined using the transflective electro-optic device to effectively remove a visual obstacle caused by the frames of the plurality of flat panel displays, increase the degree of visual immersion, and also enable minimization of the volume of the image display apparatus and modularization of the same.

Also, according to an exemplary embodiment of the present invention, flat panel displays are vertically or horizontally arranged to remove a visual obstacle caused by the frames of the flat panel displays, so that the sense of immersion can be increased.

Further, according to an exemplary embodiment of the present invention, flat panel displays are arranged in the form of a matrix to remove a visual obstacle caused by the frames of the flat panel displays, so that the sense of immersion can be increased, and an image display apparatus can be minimized in volume and modularized using a vertical or horizontal arrangement.

Moreover, according to an exemplary embodiment of the present invention, the resolution of viewpoint-specific images of a 3D display can be increased using a transflective electro-optic device, and the number of viewpoints of a 3D display can be increased using a transflective electro-optic device.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An image display apparatus using a transflective electro-optic device, the image display apparatus comprising:

a first transflective electro-optic device diagonally disposed at a predetermined angle upward from a reference horizontal plane and a predetermined distance away from a viewer;
a first display unit disposed on a side of the reference horizontal plane opposite to the viewer based on the first transflective electro-optic device; and
a second display unit disposed above or below the first transflective electro-optic device based on the first transflective electro-optic device,
wherein,
the first display unit comprises:
a plurality of flat panel displays alternately disposed horizontally and vertically for a plurality of odd-numbered rows or columns; and
a second transflective electro-optic device diagonally disposed at a predetermined angle between the flat panel display disposed horizontally and the flat panel display disposed vertically,
the second display unit comprises:
a plurality of flat panel displays alternately disposed horizontally and vertically for a plurality of even-numbered rows or columns; and
a third transflective electro-optic device diagonally disposed at a predetermined angle between the flat panel display disposed horizontally and the flat panel display disposed vertically,
screens of the respective flat panel displays of the first and second display units are disposed toward the second and third transflective electro-optic devices, respectively,
outermost portions of display regions of the respective flat panel displays are disposed to overlap each other,
screens of the first and second display units are disposed toward the first transflective electro-optic device, and
outermost portions of display regions of the respective first and second display units are disposed to overlap each other.

2. An image display apparatus using a transflective electro-optic device, the image display apparatus comprising:
a first transflective electro-optic device diagonally disposed at a predetermined angle upward from a reference horizontal plane and a predetermined distance away from a viewer;
a first display unit disposed on a side of the reference horizontal plane opposite to the viewer based on the first transflective electro-optic device; and
a second display unit disposed above or below the first transflective electro-optic device based on the first transflective electro-optic device,
wherein,
the first display unit comprises:
a plurality of flat panel displays alternately disposed horizontally and vertically for a plurality of even-numbered rows or columns; and
a second transflective electro-optic device diagonally disposed at a predetermined angle between the flat panel display disposed horizontally and the flat panel display disposed vertically,
the second display unit comprises:
a plurality of flat panel displays alternately disposed horizontally and vertically for a plurality of odd-numbered rows or columns; and
a third transflective electro-optic device diagonally disposed at a predetermined angle between the flat panel display disposed horizontally and the flat panel display disposed vertically,
screens of the respective flat panel displays of the first and second display units are disposed toward the second and third transflective electro-optic devices, respectively,
outermost portions of display regions of the respective flat panel displays are disposed to overlap each other,
screens of the first and second display units are disposed toward the first transflective electro-optic device, and
outermost portions of display regions of the respective first and second display units are disposed to overlap each other.

3. An image display apparatus using a transflective electro-optic device, the image display apparatus comprising:
a first transflective electro-optic device diagonally disposed at a predetermined angle upward from a reference horizontal plane and a predetermined distance away from a viewer;
a plurality of odd-numbered row display units vertically disposed at predetermined distance above a side of the reference horizontal plane opposite to the viewer based on the first transflective electro-optic device; and
a plurality of even-numbered row display units horizontally disposed at predetermined distance above or below the first transflective electro-optic device based on the first transflective electro-optic device,
wherein,
each of the odd-numbered row display units comprises:
a plurality of flat panel displays alternately disposed horizontally and vertically for respective odd-numbered rows; and
a second transflective electro-optic device diagonally disposed at a predetermined angle between the flat panel display disposed horizontally and the flat panel display disposed vertically,
each of the even-numbered row display units comprises:
a plurality of flat panel displays alternately disposed horizontally and vertically for respective even-numbered rows; and
a third transflective electro-optic device diagonally disposed at a predetermined angle between the flat panel display disposed horizontally and the flat panel display disposed vertically,
screens of the respective flat panel displays of the plurality of odd-numbered row display units and the plurality of even-numbered row display units are disposed toward the second and third transflective electro-optic devices, respectively,
outermost portions of display regions of the respective flat panel displays are disposed to overlap each other,
screens of the plurality of the odd-numbered row display units and the plurality of the even-numbered row display units are disposed toward the first transflective electro-optic device, and
outermost portions of display regions of the respective odd-numbered row and even-numbered row display units are disposed to overlap each other.

4. An image display apparatus using a transflective electro-optic device, the image display apparatus comprising:
a first transflective electro-optic device diagonally disposed at a predetermined angle upward from a reference horizontal plane and a predetermined distance away from a viewer;
a plurality of even-numbered row display units vertically disposed at predetermined distance above a side of the reference horizontal plane opposite to the viewer based on the first transflective electro-optic device; and a plurality of odd-numbered display units horizontally disposed at predetermined distance above or below the first transflective electro-optic device based on the first transflective electro-optic device, wherein, each of the even-numbered row display units comprises:

a plurality of flat panel displays alternately disposed horizontally and vertically for respective even-numbered rows; and a second transflective electro-optic device diagonally disposed at a predetermined angle between the flat panel display disposed horizontally and the flat panel display disposed vertically, each of the odd-numbered row display units comprises:

a plurality of flat panel displays alternately disposed horizontally and vertically for respective odd-numbered rows; and a third transflective electro-optic device diagonally disposed at a predetermined angle between the flat panel display disposed horizontally and the flat panel display disposed vertically, screens of the respective flat panel displays of the plurality of even-numbered row display units and the plurality of odd-numbered row display units are disposed toward the second and third transflective electro-optic devices, respectively, outermost portions of display regions of the respective flat panel displays are disposed to overlap each other, screens of the plurality of the even-numbered row display units and the plurality of the odd-numbered row display units are disposed toward the first transflective electro-optic device, and outermost portions of display regions of the respective odd-numbered row and even-numbered row display units are disposed to overlap each other.

5. The image display apparatus of claim 1, wherein each of the first to third transflective electro-optic devices is at least one of a transflective mirror, a transflective film, and a transparent plate combined with a transflective film.

6. The image display apparatus of claim 2, wherein each of the first to third transflective electro-optic devices is at least one of a transflective mirror, a transflective film, and a transparent plate combined with a transflective film.

7. The image display apparatus of claim 3, wherein each of the first to third transflective electro-optic devices is at least one of a transflective mirror, a transflective film, and a transparent plate combined with a transflective film.

8. The image display apparatus of claim 4, wherein each of the first to third transflective electro-optic devices is at least one of a transflective mirror, a transflective film, and a transparent plate combined with a transflective film.

* * * * *